UNITED STATES PATENT OFFICE.

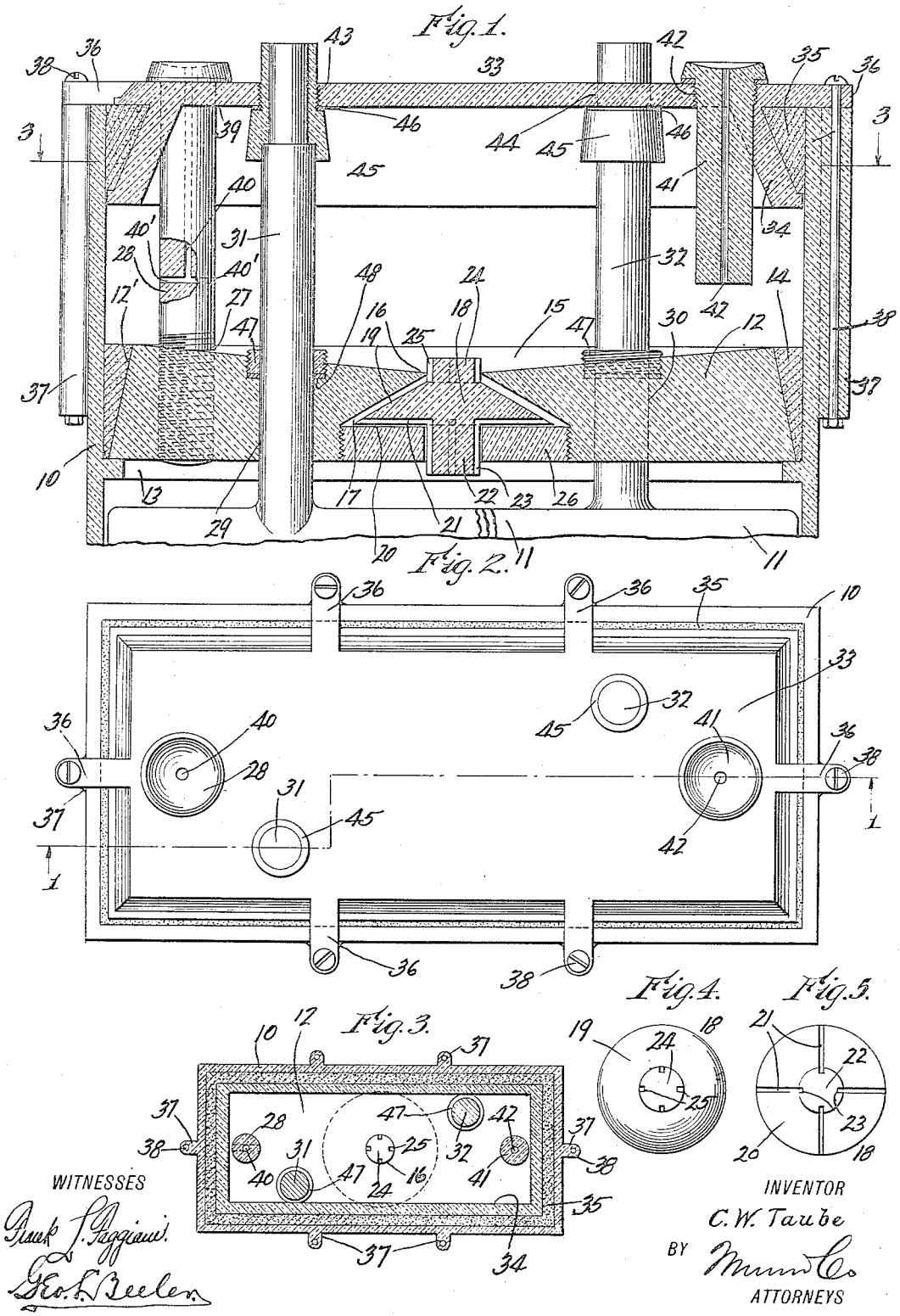

CLARENCE W. TAUBE, OF NIAGARA FALLS, NEW YORK.

BATTERY-COVER.

1,276,593. Specification of Letters Patent. Patented Aug. 20, 1918.

Application filed January 2, 1918. Serial No. 210,014.

*To all whom it may concern:*

Be it known that I, CLARENCE W. TAUBE, a citizen of the United States, and a resident of Niagara Falls, in the county of Niagara and State of New York, have invented a new and Improved Battery-Cover, of which the following is a full, clear, and exact description.

This invention relates to fluid batteries and has particular reference to a vented cover so constructed as to allow the gases to escape that are generated within the battery jar and yet prevent leakage of the fluid or electrolyte in the event of the overturning of the battery.

Among the objects of the invention is to provide a battery cover adapted especially for aeroplane or like service, where the tilting or inverting of the battery is liable to occur.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a vertical longitudinal section on the broken line 1—1 of Fig. 2.

Fig. 2 is a plan view.

Fig. 3 is a horizontal section substantially on the line 3—3 of Fig. 1.

Fig. 4 is a plan view of the automatic valve; and

Fig. 5 is a bottom plan view of the same.

Referring now more particularly to the drawings for an understanding of the construction I show at 10 the upper portion of the battery jar adapted to contain an electrolyte and any suitable or approved assemblage of plates 11, but with which *per se* I am not particularly concerned.

12 indicates an inner or lower cover having a flat bottom supported upon a flange 13 extending inwardly from the side walls of the jar. The edge of the cover 12 is beveled as indicated at 12′ and the space between the same and the walls of the jar above the flange 13 is filled with any suitable sealing mass or compound 14. The upper surface of the cover 12 is depressed or inclined as indicated at 15 toward a central hole 16. 17 indicates a conical counterbore made from the bottom surface of the cover and which constitutes a seat for a valve 18 shown in section in Fig. 1 and in detail in Figs. 4 and 5. The upper surface 19 of the body of the valve is conical and so may be said to be a counterpart of the conical seat 17 against which the valve body is adapted to fit and close when the battery is tilted or inverted either by gravity alone or by the action of the fluid from within or below the cover 12 acting against it. The bottom 20 of the valve is flat except for one or more grooves 21 formed radially therein from a downwardly projecting stem 22 which likewise is formed with grooves 23, the grooves of the flat body and those of the stem communicating with one another each to each. The top of the valve is provided with an upwardly projecting stem 24 having vertical grooves 25. But for these last mentioned grooves the stem constitutes a substantial closure for the hole 16 but with an easy sliding fit. The lower portion of the counterbore 17 is tapped to receive a washer-like plug 26 which holds the valve in place but permitting it to reciprocate up and down or along the line of the axis of the upper and lower extensions. As will be noted from Fig. 1, however, the conical space 17 is larger than the body of the valve so that with the battery in erect or substantially erect position there is always a vent provided for the gases from the electrolyte along the grooves 23 and 21 thence along the opposed conical body and valve seat, and thence out from the grooves 25 into the upper portion of the jar. When, however, the battery is tilted or inverted and the valve automatically seats against the conical valve seat communication through the lower cover is obstructed.

The cover 12 is provided also with three other openings as follows: 27 is a tapped vertical hole into which a plug 28 is fitted and which when the plug is removed provides a means to measure the height of the electrolyte or the specific gravity of the acid. At 29 and 30 are provided vertical holes for the two terminal posts 31 and 32 respectively extending upwardly from the plates 11.

As already indicated it is essential or desirable in devices of this character not only to provide a vent for gas generated within the jar but also to prevent the splashing or spilling of the liquid therefrom. Among the means therefore for accomplishing these objects I provide an upper or outer cover 33 which is substantially flat, but provided with a downwardly projecting and outwardly flaring sealing flange 34 adapted to project within the upper portion of the jar but between which and the jar is adapted to be introduced a sealing means 35. The top cover is provided with any suitable number of outwardly projecting lugs or extensions 36 indicated as two in number one on each side and one at each end which overlap vertical ribs 37 formed as integral parts or otherwise of the outer walls of the jar and through which lugs and ribs fastening members such as screws or bolts 38 are passed locking the outer cover in place. This top cover is provided with a hole 39 the axis of which coincides with the axis of the tapped hole 27 and through which the plug 28 projects. This plug may be called a combined vent and cap plug since it serves not only as a closure for the hole 27, but also as a vent for the upper portion of the jar by means of a port 40 leading from the top thereof down to a point intermediate of the upper and lower covers and provided at its lower end with lateral branches 40'.

41 indicates a vent cap tapped through a hole 42 adjacent to the other end of the cover 33 and provided with a port 42 leading straight down through it. This vent cap 41 terminates above the lower cover level with the lateral branches 40' just described.

For the accommodation of the terminal posts the top cover 33 is provided with tapped holes 43 and 44 respectively through which externally threaded bushings 45 project. These bushings are hollow and accommodate the upper ends of the terminal posts. I employ rubber or similar gaskets 46 between the shouldered lower ends of the bushings and the under surface of the top cover making a tight connection between these parts and the top cover. I also employ bushings 47 tapped into the upper surface of the lower cover against gaskets 48 for a similar purpose.

From this specific description of the mechanism, its mode of operation and advantages will be readily appreciated. During the operation or use of the battery any gas that may be generated below the inner cover may escape readily into the space between the covers as already set forth and thence outward to the atmosphere through either or both of the ports 40 and 42. If any of the liquid splashes past the valve 18 no damage can result because it cannot splash or spill out through either of the ports 40 or 42 but will soon flow back again into the lower portion of the battery by virtue of the centrally sloping surface 15 and the ports formed along the stems and bottom of the valve. If, however, the battery is tilted or inverted the valve 18 promptly closes and so seals the outlet from the liquid chamber. Any small quantity of liquid that may have passed, however, past the valve will not be sufficient to flow out of either of the ports for the reason that when the battery is tilted or inverted the inner ends of said ports will be so far above such liquid wherever the liquid may be located in the upper chamber.

The outwardly projecting lugs or extensions 36 of the top cover 33 not only make the connection for the cover most secure, but they also serve the purpose of helping to keep the contents of the cell from dropping out of the battery when it is inverted, inasmuch as the sealing compound 14 and 35 might not be sufficient for this purpose.

I claim:

1. The combination with a battery jar having an internal flange and a plurality of vertical external ribs, of inner and outer covers for the jar, the inner cover being supported upon said flange, the outer cover having outwardly extending lugs alining with said ribs, fastening means passing through the lugs and ribs, and sealing means between each cover and the inner walls of the jar.

2. The combination with a battery jar for holding a quantity of liquid and a plurality of plates within the jar projecting into the liquid, of a plurality of inner and outer spaced covers for the jar, means to seal the covers and hold them in fixed position with respect to the jar walls, said covers having vertically alined pairs of holes, terminal posts extending from the plates upwardly through said holes, means to seal the posts in said holes, and vent means to permit the escape of gas from beneath the inner cover, said vent means including an automatically movable valve to close the vent when the battery is tilted or inverted.

3. The combination with a battery jar adapted to contain a liquid, of a cover therefor having a hole therethrough, the upper surface of the cover being provided with a concavity leading toward said hole, means to seal the rim of the cover in position with respect to the jar walls, and an automatically operated valve coöperating with said cover hole and serving to seal the same when the battery is tilted or inverted, the valve, however, being provided with vent means to allow the escape of gas from the liquid chamber when the battery is in upright position.

CLARENCE W. TAUBE.